(No Model.)
H. BAROTTE.
DRY EXTRACT OF COFFEE AND MODE OF PREPARING THE SAME.
No. 439,318. Patented Oct. 28, 1890.
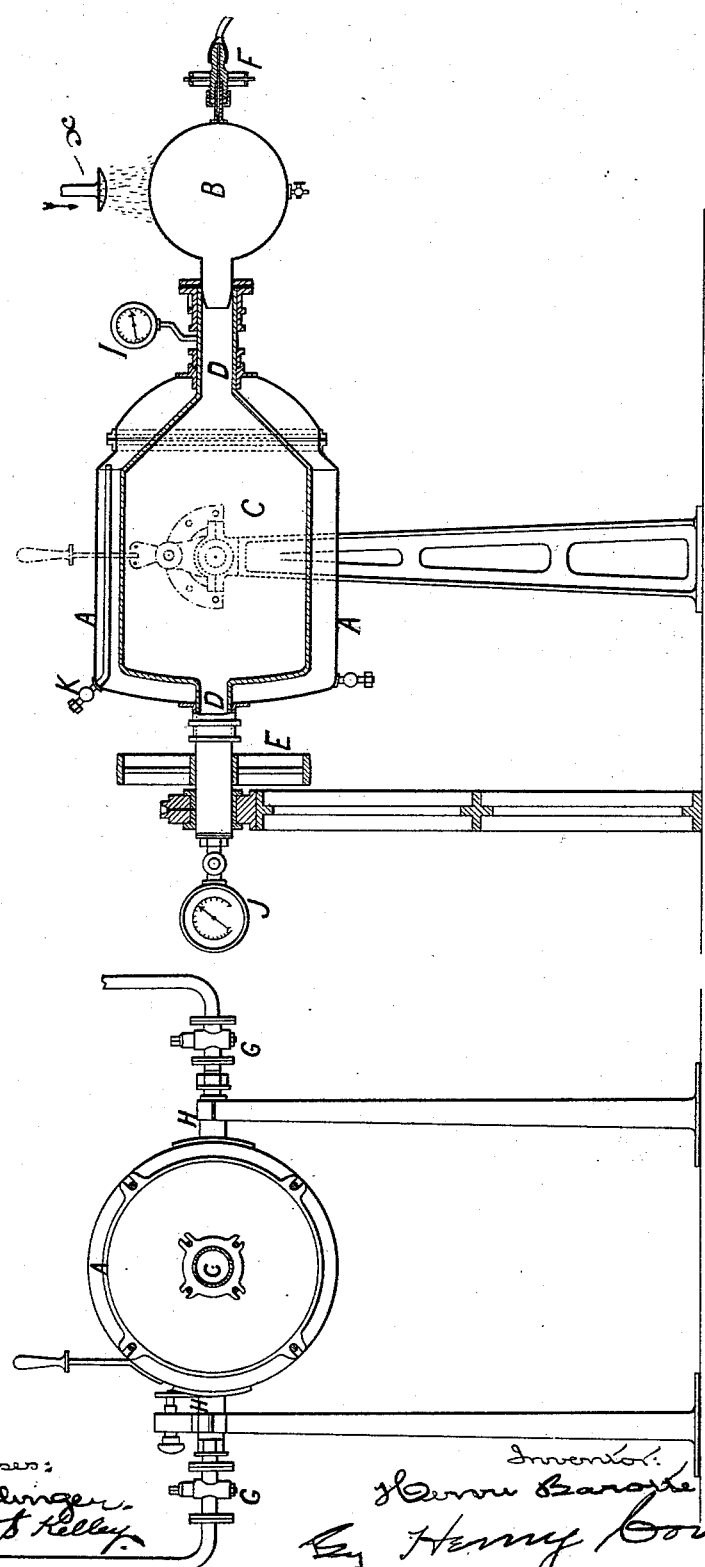

UNITED STATES PATENT OFFICE.

HENRI BAROTTE, OF PARIS, FRANCE, ASSIGNOR TO THE SOCIÉTÉ BAROTTE, MEYER & COMPAGNIE, OF SAME PLACE.

DRY EXTRACT OF COFFEE AND MODE OF PREPARING THE SAME.

SPECIFICATION forming part of Letters Patent No. 439,318, dated October 28, 1890.

Application filed February 12, 1890. Serial No. 340,120. (No model.) Patented in France May 4, 1887, No. 183,337, and in England December 10, 1889, No. 19,882.

*To all whom it may concern:*

Be it known that I, HENRI BAROTTE, a citizen of the Republic of France, residing at Paris, France, have invented Improvements in Dry Extract of Coffee and in Methods of Preparing the Same, (for which patents have been granted in France, No. 183,337, dated May 4, 1887, and in Great Britain, No. 19,882, dated December 10, 1889,) of which the following is a specification.

My invention relates to a new and improved method of producing a dry extract of coffee, containing all the aromatic and other principles usually present in the decoction of coffee as prepared for table use, from which extract such a decoction may be prepared in a few minutes simply by addition of hot water.

In carrying out my invention I proceed as follows: The coffee in a roasted and finely-ground state is introduced into a close drum or cylinder rotatively mounted and communicating at one end with a spherical condenser, upon the outer surface of which is sprayed cold water, so that the vapors produced may be condensed. About the drum or cylinder which contains the coffee is arranged a heating-jacket, into which is admitted superheated steam, whereby the dry distillation of the coffee is conducted.

In the preferred form of my apparatus I prefer to employ a pressure or vacuum gage, as well as a thermometer, for indicating the pressure and temperature within the drum or cylinder containing the coffee. The air is exhausted from the interior of the cylinder and the condenser by means of any suitable device, as a pump.

The coffee, previously roasted and finely ground, is introduced into the close drum, and the condenser is placed in communication with the latter, so that the vapors generated may pass into the latter and be condensed. This condenser I prefer to connect with the air-exhausting device by means of a rubber or other tube. The air is then exhausted from the interior of the drum and condenser, and the apparatus is set in motion in its bearings. The superheated steam is then admitted to the steam-jacket, preferably through one or both of the hollow trunnions thereof, if it be mounted so as to tilt, and after a certain time has elapsed the vacuum-gage will indicate a reduction in the vacuum, probably due to the expansion from the heat. The vacuum should then be re-established by means of the exhauster and should never be allowed to fall below sixty-five centimeters of mercury. When the thermometer on the apparatus indicates an internal temperature in excess of 160° centigrade, the internal pressure is allowed to rise, and the vacuum-gage quickly falls. When the vacuum-gage indicates a pressure of no more than ten centimeters of vacuum, the steam-supply is cut off, when the temperature will be about 200° centigrade. When this temperature has been attained, the apparatus is allowed to stand five or ten minutes, during which time the vacuum will fall to 0 millimeters and the thermometer will rise to about 210° centigrade. As soon as this temperature is reached (and it should not be exceeded) the cooling must be commenced by injecting cold or cool water in small quantities through an inlet into the steam-jacket. When the apparatus is well cooled, the rotation is discontinued, air is introduced into the same, and the distillate is collected in the condenser. The distilled product thus obtained is a yellow or redish liquid, which must be filtered and immediately added to extract of coffee, which has been previously prepared, as hereinafter set forth.

The residue left after the distillation in the drum is removed and placed in a suitable vessel and a suitable quantity of well-heated distilled water added thereto. The resulting aqueous infusion or extract is evaporated *in vacuo* in the usual manner, and the thick extract thus obtained may be sweetened with sugar, if desired. The extract is then dried *in vacuo* by the application of heat. The pulverized product is then added to a corresponding proportion of the filtered distillate, as before described, whether sugar has or has not been added, and the moist mixture is dried *in vacuo*, either under the influence of heat or by means of chemical absorbents, as sulphuric acid or chloride of calcium. The